United States Patent

Al Ghatta et al.

[11] Patent Number: 5,362,763
[45] Date of Patent: Nov. 8, 1994

[54] FOAMED CELLULAR POLYESTER RESINS AND PROCESS FOR THEIR PREPARATION

[75] Inventors: Hussain A. K. Al Ghatta, Fiuggi; Tonino Severini, Colleferro; Luca Astarita, Napoli, all of Italy

[73] Assignee: M. & G. Ricerche S.p.A., Pozzilli, Italy

[21] Appl. No.: 98,341

[22] PCT Filed: Aug. 5, 1993

[86] PCT No.: PCT/EP92/02889
 § 371 Date: Sep. 28, 1993
 § 102(e) Date: Sep. 28, 1993

[87] PCT Pub. No.: WO93/12164
 PCT Pub. Date: Jun. 24, 1993

[30] Foreign Application Priority Data

Dec. 16, 1991 [IT] Italy ............................ MI91A003366

[51] Int. Cl.$^5$ .............................. C08J 9/08; C08J 9/14
[52] U.S. Cl. ........................................ 521/79; 264/50; 264/53; 264/54; 521/182
[58] Field of Search ................... 521/79, 182; 264/50, 264/53, 54

[56] References Cited

U.S. PATENT DOCUMENTS 5,000,991  3/1991  Hayashi et al.

FOREIGN PATENT DOCUMENTS

| 0442759A2 | 8/1991 | European Pat. Off. ......... C08J 9/04 |
| 57-038119 | 3/1982 | Japan ................................. C08J 9/00 |
| 1-009244 | 1/1989 | Japan ................................. C08J 5/18 |
| WO90110667 | 9/1990 | WIPO .............................. C08J 9/00 |
| PCT/NL90/-00152 | 3/1991 | WIPO . |
| PCT/EP92/-00667 | 10/1992 | WIPO . |
| PCT/EP92/-00668 | 10/1992 | WIPO . |
| PCT/EP92/-00669 | 10/1992 | WIPO . |
| PCT/EP92/-00670 | 10/1992 | WIPO . |
| PCT/EP92/-02375 | 4/1993 | WIPO . |

Primary Examiner—Morton Foelak
Attorney, Agent, or Firm—Edward D. Manzo; Ted K. Ringsred

[57] ABSTRACT

A foamed cellular material from polyester resins is obtained by extrusion foaming of polyester resins having melt strength higher than 8 centinewton, intrinsic viscosity greater than 0.8 dl/g and complex melt viscosity higher than 25,000 poises.

4 Claims, No Drawings

FOAMED CELLULAR POLYESTER RESINS AND PROCESS FOR THEIR PREPARATION

The present invention refers to foamed cellular polyester resins and processes for their preparation.

The commercial foamed cellular polymers, such as foamed polystyrene and polyurethane, find wide application in the building, parking and padding sectors.

The foamed cellular polyester resins have up to now found little application due to the not satisfactory properties of the foamed polyester materials till now produced.

European application 0 372 846 describes foamed cellular polyester resins obtained by extrusion foaming of polyester resins added with anhydrides of tetracarboxylic acids. Pyromellitic anhydride is the preferred additive and the possibility of using amounts thereof up to 5% by weight is disclosed.

The obtained foamed cellular materials are not homogeneous and need thermal post-treatments either to obtain more homogeneous foamed structures with finer cells and to develop heat stability characteristics of the formed articles.

It is also necessary that the foamed articles be quickly cooled after the extrusion foaming step to temperatures lower than the Tg of the polyester resin. This to the effect of maintaining the crystallinity of the resin to relatively low values (lower than about 15%). U.S. Pat. No. 4,132,702 describes branched polyester resins obtained by solid state reaction of polyester resins added with branching agents containing at least three reactive groups capable of forming ester groups.

Examples of said branching agents are pentaerythritol, tri-and tetracarboxylic acids and their esters, such as trimesic and piromellitic acids.

The obtained branched polyesters show high melt strength values combined however with relatively low values of the melt viscosity.

There are described also modified polyester resins having melt viscosity sufficiently high combined, however with low values of the melt strength. The intrinsic viscosity of the branched resins is higher than 1.2 dl/g.

The above cited modified polyester resins are indicated as suitable to prepare foamed materials. No examples and data on the characteristics of the foamed materials are given.

It has now unexpectedly found that it is possible to prepare foamed cellular polyester resins having valuable morphological and mechanical properties by subjecting to extrusion foaming polyester resins having the following characteristics:

melt strength higher than about 8 centinewton;
complex melt viscosity higher than about 25,000 poises;
intrinsic viscosity higher than 0.8 dl/g.

Foamed cellular polyester resins endowed of particularly valuable properties are obtained by extrusion foaming of resins having melt strength comprised between 15 and 30 centinewton or higher, melt viscosity between 30,000 and 50,000 poises or higher and intrinsic viscosity between 0.85 and 1.95 dl/g.

The complex viscosity and the melt strength are measured at 270° C. according to the analytical procedure reported in the examples. As therein indicated, in case of incomplete melting of the resin at 270° C., the determination is carried out at 290° C. The values corresponding to the minimum values of melt strength acid complex viscosity measured at 270° C. are set forth in the analytical procedure.

The properties above indicated are shown by the resins before extrusion foaming; similar properties are also possessed by the resin after foaming.

The foamed cellular polyester resins of the invention show mechanical properties superior to the commercial foamed resins such as foamed polystyrene (STIRODUR from Bayer) and foamed polyurethane resins.

For example the compression set is higher; while the foamed polyester resins do not collapse up to compression of 15-20% the commercial foamed resins do not resist to compressions higher than about 8%.

The foamed cellular polyester resins of the invention moreover are more rigid with respect to the commercial resins: the flexural rigidity is higher than 3 MPa and the flexural modulus is generally comprised between 20-120 MPa; whereas in the case of STIRODUR and the foamed polyurethane resins the values are respectively comprised between 2-3 MPa and 17-18 MPa.

The density of the resins is generally comprised between 40 and 500 kg/m$^3$. The cells have dimension comprised between 50 and 200 microns and more particular between 50 and 120 microns. The cells are prevailingly or totally closed. The wall thickness is comprised between 40 and 100 microns.

A method for obtaining the foamed polyester resins of the invention comprises extruding a polyester resin having intrinsic viscosity higher than about 0.52 dl/g added of a dianhydride of a tetracaboxylic acid, particularly an aromatic acid in amounts from about 0.1 and 1% by weight, subjecting the resin to solid state upgrading up to obtain a final viscosity of 0.85-1.95 dl/g and then extrusion foaming the resin. The extrusion foaming can be carried out in the presence of amounts from 0.1 to 1% by weight of a dianhydride of a tetracarboxylic acid. In both cases, pyromellitic dianhydride is the preferred dianhydride.

The preferred method for obtaining the polyester resin comprises upgrading the resin in the presence of a dianhydride of a tetracarboxylic acid up to obtain I.V. values comprised between 1.0 and 1.95 dl/g and then subjecting the resin to extrusion foaming.

The conditions of the solid state upgrading of polyester resins in the presence of dianhydride of tetracarboxylic acids are known in literature (see for example European application 86830440.5 whose description is herein incorporated for reference). Upgrading temperatures comprised between 170° C. and 220° C. are suitable.

Residence times in the upgrading reactor higher than about 1 h are generally used.

The residence times in the case of extrusion in monoscrew extruders are comprised between about 3 and 10 minutes.

Any foaming or expanding agent can be used for foaming the resins of the invention.

Easily vaporizable liquids and thermally decomposable compounds can be used. Inert gas can be used, such as $CO_2$.

The saturated aliphatic, cycloaliphatic hydrocarbons, the aromatic hydrocarbons and the hologenated hydrocarbons are preferred. Examples of usable hydrocarbons are butane, pentane, hexane, cyclohexane, trichloromonofluoromethane, 1,2-dichlorotetrafluoroethane.

Generally the foaming agent is injected into the melted mixture through openings in the initial part of the extruder.

The used amount can arrive at 20-30% by weight of the melted mixture. Preferably the quantity is comprised between 1-5% by weight in the case of the chlorofluorohydrocarbons.

Any type of extruder suitable for the extrusion foaming can be used; single screw, twinscrew or pluriscrew extruders can be used.

In order to improve the structural characteristics of the cells obtaining finer and more uniformly distributed cells, the polyester resin can be added with amounts up to 5% by weight of a compound of a metal from I to III group of the periodic system, such as for example sodium carbonate, calcium carbonate, aluminium or magnesium stearate, aluminium or magnesiuramyrisate, sodium terephtalate.

The resins may contain stabilisers, nucleating agents, flameretardants, and similar additive normally used in the polyester resins.

The polyester resins usable are the resins obtainable by polycondensation of an aromatic bicarboxylic acid with a diol. Examples of aromatic acids are terephtalic and isophtalic acids, naphtalendicarboxylic acids and diphnenylether dicarboxylic acid.

Examples of glycols are ethylenglycol, tetraethylenglycol, cyclohexandimethanol, 1,4-butandiol. Polyethylenterephtalate, polybutylenterephtalate and the polyethylenterephtalate copolymers containing up to 20% of units deriving from isophtalic acid are the preferred resins. The starting resins have intrinsic viscosity higher than about 0.52 dl/g and before being foaming extruded are dried to humidity values lower than 200 ppm, preferably below 100 ppm. Recycled polyester resins can also be used; the upgrading and foaming treatments are similar to the ones of the non-recycled resins.

After extrusion foaming, the foamed resin generally obtained in the form of a panel or having a cylindrical profile, is cooled to temperatures below the Tg of the polyester. This to maintain the cristallinity of the polyester resin below about 15%. In order to confer resistance to thermal deformation to the formed articles to be used in thermal cycles such as food containers to he heated in a microwave oven, it is convenient to subject the articles to thermal treatment to temperatures higher than 60° C., generally comprised between 60° C. and 120° C. for times up to about 5 minutes.

The following examples are given to illustrate and not to limit the invention.

COMPARATIVE EXAMPLE 1

50 kg/h of polyethylenterephtalate (PET) having intrinsic viscosity of 0.80 dl/g were fed in continuous to a single screw blow extruder having the following characteristics:
diameter of the screw: 90 mm
screw ratio length/diameter: 30.
The test conditions were as follows:
temperature of the melting zone: from 224° to 260° C.
temperature of the injection zone: 240° C.
temperature of the cooling zone: from 240° C. to 220° C.
temperature of the head: from 240° to 275° C.
temperature of the melt: 224° C.
pressure of the melt: 5.2 MPa
runs of the screw: 24 RPM
blowing agent: trichlorofluoromethane (HCFC; 3% by weight on the total polymer)
nucleating agent: talc (0.8% by weight on the total polymer)
average residence time in the extruder: 4.5 minutes.

A ring die having a diameter of 40 mm was used for the extrusion.

No foamed material was obtained; the material was not foamable due to the too low melt strength (for the melt strength value and other data see Table 1).

Other blowing agents such as nitrogen, ethyl alcohol, carbon dioxide were used in various preparations, but without obtaining foamed materials.

COMPARATIVE EXAMPLE 2

The test of comparative example 1 was repeated with the difference that PET with I.V. of 0.92 dl/g was fed (upgraded to I.V. value of 0.92 by solid state polyaddition reaction starting from PET with I.V.=0.70 dl/g added with 0.15% by weight of pyromellitic dianhydride).

No foamed material was obtained.

In Table 1 are reported the theological characteristics of the PET used.

EXAMPLE 1

The test of comparative example 1 was repeated with the difference that PET with I.V. of 0.82 dl/g was fed (obtained by solid state upgrading reaction at 180° C. of PET with I.V.=0.71 dl/g added with 0.15% by weight of pyromellitic dianhydride) and contemporaneously also pyromellitic dianhydride in quantity of 500 g/h was fed in continuous through the feeding port of the extruder.

The melt temperature in the extruder was 259° C.; the pressure 9.1 MPa.

A foamed material with regular closed cells was obtained.

The bulk density of the material was 150/180 kg/m$^3$.

The compression set was 1.5 MPa; the compression modulus 15.4 MPa and the specific flexural resistance 10 MPa m$^3$/kg.

The tensile strength was 3.3 MPa; the tensile modulus 80.7 MPa and the specific tensile strength 22/18 MPa m$^3$/kg.

EXAMPLE 2

The test of comparative example 1 was repeated with the difference that PET with I.V.=1.17 dl/g was fed (the polyester was obtained by solid state upgrading of PET with I.V.=0.75 dl/g added with 0.15% of pyromellitic dianhydride, the upgrading having been continued up to obtain the I.V. value of 1.17 dl/g).

A foamed material was obtained with regular closed cells, having the following characteristics:
bulk density: 100/120 kg/m$^3$
compression set: 1 MPa
compression modulus: 4.0 MPa
flexural rigidity: 4.8 MPa
flexural modulus: 25 MPa
specific flexural resistance: 48/40 MPa m$^3$/kg
specific tensile strength: 10/8 MPa m$^3$/kg
In Table 1 are reported the theological characteristics of the PET used.

EXAMPLE 3

The test of comparative example 1 was repeated with the difference that PET with I.V.=0,823 dl/g was fed; this PET was obtained from PET with I.V.=0.75 dl/g added with 0.15% of pyromellitic dianhydride upgraded up to obtain I.V.=0.832 dl/g.

The average residence time was 8 minutes.

Foamed material was obtained with prevailingly closed cells.

The rheological characteristics of the PET added with pyromellitic dianhydride are reported in table 1.

In Table 1 are reported the theological characteristics of the polyester resins used in the examples; the values of the melt viscosity and the elastic modulus G' are those at point of maximum.

The determination was carried out measuring the variation of this property versus time.

The measurements were carried out with a Rheometrics plate and cone rheometer and with a rheograph Geottfert Rheograph 2002 having a capillary die.

Unless otherwise indicated, all the theological measurements reported in the specification and in the examples were carried out at 270° C.

The specimens in the form of granules were dried under vacuum at 110° C. for at least 12 hours. The chips were melted and compressed in the chamber before starting the measurements.

The time sweeps were conducted with an angle of 0.1 rad and with a diameter of the cone of 25 mm. The frequency was 10 rad/sec with a deformation of 25% with time of 1 hour.

The frequency sweeps were conducted with a frequency in the range of 0.1–100 rad/sec and with deformation of 1%.

In the measurements with the capillary rheometer Goettfert, the samples were introduced into the rheometer in nitrogen flow to assure the stability of the material during the test.

The deformation rate was in the range of 20 to 2000 sec-1. The capillary geometry was 30 mm length and 1 mm diameter of the die with an entrance angle of 90°.

The melt strength was measured extruding a filament of polymer in the capillary of the Goettfert rheometer with piston rate of 0.2 mm/sec.

The filament was taken between steel toothed wheels and there was applied a linear acceleration of the peripheric speed. The acceleration was 60 mm/sec$^2$ and the reported strain was the force that the filament applied to the wheels at the maximum speed (1000 mm/sec).

All the rheometric measurements were conducted according to ASTM D 4440 and the calculations where made according to ASTM D 4065.

In case of incomplete melting of the resin at 270° C., the measurements were carried out at 290° C. using for the melt strength a diameter of the die of 2 mm. The value of the melt strength at 290° C. and using a diameter of the die of 2 mm corresponding to the minimum value of 8 centinewton at 270° C. and using a diameter of the die of 1 mm is 2–3 newton; the value for the complex viscosity at 290° C. corresponding to the 25,000 poises at 270° C. is 15,000 poises.

The data on the compression set measurements, flexural rigidity and flexural modulus were obtained according to ASTM D 1621, D 790 and D 1623 respectively.

The intrinsic viscosity was determined in solutions of 0.5 g polyester resin in granule in 100 ml of a 60/40 weight mixture of phenol and tetrachloroethane at 25° C., operating according to ASTM 4063-86.

TABLE 1

| Polyester | I.V. dl/g | Melt Strength centinewton | Complex viscosity Poise 10$^4$ | Elastic modules dine/cm$^2$ 10$^4$ |
|---|---|---|---|---|
| Comp. Ex. 1 | 0.80 | 0.2 | 1.05 | 1.04 |
| Comp. Ex. 2 | 0.92 | 4.2 | 2.5 | 21.8 |
| Example 1 | 0.862 | 25 | 3.59 | 26.0 |
| Example 2 | 1.18 | 20 | | |
| Example 3 | 0.823 | 10–12 | 6.23 | 43.2 |

EXAMPLE 4

The test of comparative example 1 was repeated with the only difference that PET with I.V.=1.95 dl/g was fed (the PET was obtained by solid state upgrading reaction at 215° C. of PET of recyle having I.V.=0.74 dl/g added with 0.3% by weight of pyromellitic dianhydride).

The rheological properties of the used PET were: melt strength 43 centinewton (measured at 290° C. with a diameter of the die of 2 mm); complex viscosity 40 poise 10$^4$ and elastic modulus G' 100 dine cm$^2$10$^4$ (both the determinations were carried out at 290° C.).

The temperature of the melt in the extruder was 259° C.; the pressure of 9.1 MPa.

A foamed material was obtained with regular closed cells; the bulk density of the material was 50/80 kg/m$^3$. The compression set was 20 MPa; the compression modulus 17.0 MPa and the specific compression resistance 11.6 MPa m$^3$/kg.

The flexural rigidity was 7.4 MPa and the flexural modulus 64 MPa; the specific flexural resistance 44/36.1 MPa m$^3$/kg. The tensile strength was 4.0 MPa; the modulus at yield 83 MPa and the specific resistance to yield 24/29 m$^3$/kg.

EXAMPLE 5

The test of comparative example 1 was repeated with the difference that PET with I.V.=1.52 dl/g was fed. The PET was obtained by solid state upgrading reaction at 215° C. of PET with having I.V.=0.60 dl/g added with 0.15% by weight of pyromellitic dianhydride.

The rheological characteristics of PET were: melt strength 9.5 centinewton (measured at 290° C. with a diameter of the die of 2 mm); complex viscosity 4 poise 10$^4$; elastic modulus 85 dine/cm$^2$/10$^4$ (both the determinations were carried out at 290° C.).

The temperature of the melt in the extruder was 259° C.; the pressure 9.1 MPa.

A foamed material was obtained with regular closed cells. The bulk density was 70/180 kg/m$^3$; the compression set 1.6 MPa, the compression modulus 16 MPa and the specific resistance to compression 11.2 MPa m$^3$/kg.

The flexural rigidity was 6.2 MPa and the flexural modulus 59 MPa. The specific flexural resistance 42/35.1 MPa m$^3$/kg. The tensile strength was 3.6 MPa; the modulus at yield 81 MPa and the specific resistance at yield 23/19 m$^3$/kg.

We claim:

1. Process for the preparation of a foamed cellular polyester resin from a polyester containing a foaming agent comprising the steps of extrusion foaming a polyester resin having said foamable melt strength higher than 8 centinewton, intrinsic viscosity between 0.85 and 1.95 dl/g and complex melt viscosity comprised between 30,000 poises at 270° C. and 300,000 poises at 290° C.

2. Process for the preparation of the foamed cellular material according to claim 1, comprising the step of extrusion foaming a polyester resin upgraded with a dianhydride of a tetracarboxylic acid up to values of intrinsic viscosity comprised between 1.0 and 1.95 dl/g.

3. Process according to claim 2, wherein the polyester resin is foaming extruded in the presence of a dianhydride of a tetracarboxylic acid in amounts from 0.1 and 1% by weight on the resin.

4. Process according to claims 2 or 5, wherein the used dianhydride is the pyromellitic dianhydride.

* * * * *

UNITED STATES PATENT AND TRADEMARK OFFICE
CERTIFICATE OF CORRECTION

PATENT NO. : 5,362,763                          Page 1 of 2
DATED : November 8, 1994
INVENTOR(S) : Al Ghatta et al It is certified that error appears in the above-indentified patent and that said Letters Patent is hereby corrected as shown below:

Col. 1: line 9, change "parking" to --packing--; line 68, change "acid" to --and--.

Col. 3: line 21, change "terephtalic" to --terephthalic--; line 22, change "isophtalic" to --isophthalic--, and change "naphtalendicarboxylic" to --naphthalenedicarboxylic--; line 23, change "diphnenylether" to --diphenylether--; line 25-26, change "Polyethylenterephtalate" to --Polyethyleneterephthalate--; line 26, change "polybutylenterephtalate" to --polybutyleneterephthalate--; line 27, change "polyethylenterephtalate" to --polyethyleneterephthalate--; line 28, change "isophtalic" to --isophthalic--; and line 52, change "polyethylenterephtalate" to --polyethyleneterephthalate--.

Col. 4: line 21, change "theological" to --rheological--.

Col 5: line 1, change "0.15%" to --1.15%--; line 8, change "theological" to --rheological--; line 17, change "theological" to --rheological--.

Col. 6: line 41, change "with having" to --with--; line 47, change "dine/cm$^2$/10$^4$" to --dine/cm$^2$ 10$^4$--; line 63, change "foaming a" to --foaming said foamable--; line 64, change "said foamable" to --a--.

UNITED STATES PATENT AND TRADEMARK OFFICE
CERTIFICATE OF CORRECTION

PATENT NO. : 5,362,763
DATED : November 8, 1994
INVENTOR(S) : Al Ghatta et al

It is certified that error appears in the above-indentified patent and that said Letters Patent is hereby corrected as shown below:

Col. 8: line 4, change "5" to --3--.

Signed and Sealed this

Eighteenth Day of April, 1995

*Attest:*

BRUCE LEHMAN

*Attesting Officer*     Commissioner of Patents and Trademarks